(12) United States Patent
Jackson et al.

(10) Patent No.: US 6,387,193 B1
(45) Date of Patent: May 14, 2002

(54) REPAIR MATERIAL, PROCESS OF REPAIRING USING THE REPAIR MATERIAL, AND ARTICLE REPAIRED

(75) Inventors: Melvin Robert Jackson, Niskayuna; Aaron Todd Frost, Ballston Spa; Charles Gitahi Mukira, Clifton Park; Ann Melinda Ritter, Niskayuna, all of NY (US); Paul Vincent Crimi, Oldsmar, FL (US); Raymond Alan White, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/566,670

(22) Filed: May 8, 2000

Related U.S. Application Data (62) Division of application No. 09/198,633, filed on Nov. 24, 1998, now Pat. No. 6,210,635.

(51) Int. Cl.[7] ................................................ C22C 19/05
(52) U.S. Cl. ...................................................... 148/428
(58) Field of Search ........................... 420/445; 148/428

(56) References Cited

U.S. PATENT DOCUMENTS

| | | | | |
|---|---|---|---|---|
| 4,219,592 A | * | 8/1980 | Anderson et al. ............ 427/405 |
| 4,830,934 A | * | 5/1989 | Ferrigno et al. ............. 428/678 |
| 4,973,366 A | * | 11/1990 | Yasuda et al. .............. 148/11.5 |
| 4,981,644 A | * | 1/1991 | Chang ......................... 420/442 |
| 5,035,958 A | * | 7/1991 | Jackson et al. ............. 428/553 |
| 5,043,138 A | * | 8/1991 | Darolia et al. .............. 420/443 |
| 5,395,584 A | * | 3/1995 | Berger et al. ................ 420/443 |
| 5,732,467 A | | 3/1998 | White et al. |
| 5,732,468 A | | 3/1998 | Galley et al. |
| 5,902,421 A | * | 5/1999 | Christy ........................ 148/528 |
| 6,210,635 B1 | * | 4/2001 | Jackson et al. ............. 420/445 |

FOREIGN PATENT DOCUMENTS

| | | |
|---|---|---|
| DE | 38 13 157 | 12/1988 |
| EP | 0 302 302 | 2/1989 |
| EP | 0 351 948 | 1/1990 |
| EP | 0 800 889 | 10/1997 |
| GB | 2 024 858 | 1/1980 |

* cited by examiner

Primary Examiner—Roy King
Assistant Examiner—Harry D. Wilkins, III
(74) Attorney, Agent, or Firm—Paul J. DiConza; Donald S. Ingraham (57) ABSTRACT

A composition comprises cobalt; chromium; carbon; boron; zirconium; aluminum; at least one refractory material; and nickel. The composition is used as a repair material for repairing superalloy articles in a repair process.

27 Claims, 5 Drawing Sheets

REPAIR MATERIAL, PROCESS OF REPAIRING USING THE REPAIR MATERIAL, AND ARTICLE REPAIRED

This application is a division of application Ser. No. 09/198,633, filed Nov. 24, 1998, now U.S. Pat. No. 6,210,635, filed Dec. 18, 1998, which is hereby incorporated by reference in its entirety.

FIELD OF THE INVENTION

The invention relates to compositions of matter. In particular, the invention relates to compositions of matter that are usable for the repair of turbines and their components.

Turbines, airfoils, vanes, buckets, blades, nozzles, and like elements and their components (hereinafter "turbine components"), are used in high pressure applications.

Turbine components are often formed from superalloy materials. Superalloy materials possess desirable oxidation and corrosion resistance, resistance to thermal fatigue cracking, and high strength. One known superalloy material is GTD111 (a nickel-based superalloy having a composition in approximate weight percent comprising 14% chromium (Cr), 9.5% cobalt (Co), 3.8% tungsten (W), 1.5% molybdenum (Mo), 4.9% titanium (Ti), 3.0% aluminum (Al), 0.1% carbon (C), 0.01% boron (B), 2.8% tantalum (Ta), and a balance (BAL) of nickel (Ni)). The GTD111 material, when used in turbine components, is provided with one of an equiaxed (EA), single crystal, and directionally solidified (DS) microstructure.

Turbine components suffer damage and degradation during service such as often occurs at a turbine bucket's tip. This degradation includes serious material loss at a trailing edge of the tip. The material loss is due, at least in part, to oxidation and hot corrosion damage, as well as thermal fatigue cracking of the material.

A damaged turbine component must be repaired if it is to return to service. In the past, a damaged turbine component, for example a turbine bucket with a damaged tip, has had the tip ground away to a depth approximately equal to a turbine bucket tip cover plane. A new turbine bucket tip is built up on the cover plane by a multiple weld-pass repair process, in which the repair material is fed into the weld pool as the pool is moved around the perimeter of a cover tip on the turbine component and melted thereon to form a new tip.

One such turbine component weld repair process comprises repairing by welding without both pre-heating of the turbine component and continued heating of the turbine component during the repair process. The repair material for such a turbine component weld repair process often uses a nickel-based superalloy repair material, especially if the turbine component is formed from a nickel-based superalloy material. For example, one nickel-based superalloy repair material comprises IN625 (a nickel-based superalloy having a composition in approximate atomic percent comprising 24.64% chromium (Cr), 5.6% molybdenum (Mo), 0.25% titanium (Ti), 0.44% aluminum (Al), 0.25% carbon (C), 2.1% iron (Fe), 2.3% niobium (Nb) and a balance (BAL) of nickel (Ni)). IN625 nickel-based superalloy possesses acceptable weld adherence and mechanical compatibility with a superalloy turbine material, such as a GTD111 nickel-based superalloy. Welds comprising IN625 repair material on a turbine component, such as a GTD111 turbine component, exhibit a low cracking frequency following a weld repair process. Further, a repaired turbine component comprising IN625 repair material exhibits low cracking frequency after subsequent heat treatments, which is a desirable turbine component characteristic.

An IN625 repair material, while exhibiting low crack frequency, possesses undesirable strengths and oxidation resistance in a repaired turbine component and so can only be used to repair turbine components subjected to moderated temperatures and times encountered in high pressure and temperature turbine component usage. Therefore, a GTD111 repair material was investigated as a weld repair material for repairing a GTD111 turbine component. A repair process using GTD111 repair material heats the turbine component prior to, and during, the weld repair process. The turbine component temperature reaches temperatures greater than about 950° C. during heating to avoid forming cracks in the turbine component and repair material. The cracking would require undesirable re-work of a once-repaired turbine component, and may not correct or eliminate cracking problems in the repaired turbine components, which, of course, is undesirable.

A turbine component repaired with a GTD111 produces an enhanced strength weld repair when compared to a turbine component repaired with IN625. A repaired turbine component comprising a GTD111 is more oxidation resistant than IN625, but is prone to oxidation since its oxidation resistance is only as much as the original turbine component material's oxidation resistance. While a repaired turbine component with GTD111 exhibits enhanced oxidation resistance compared to that of a repaired turbine component with IN625, the oxidation resistance is not as high as desirable.

Accordingly, a crack and oxidation resistant repair material for repairing turbine components is needed. The repair material should not require additional heating of the turbine component for repair, because of the undesirable cracking effects associated with heating. Further, the repair material should be more oxidation resistant than known repair materials, such as, but not limited to, IN625 and GTD111, and be as strong as or stronger than IN625.

SUMMARY OF THE INVENTION

The invention overcomes the above noted deficiencies of prior repair materials.

The invention provides a composition that comprises cobalt, chromium, carbon, boron, zirconium, aluminum, at least one refractory material, and nickel that can be used to repair a superalloy article.

Also, the invention provides a repair process for a superalloy article using a repair material. The repair material comprises cobalt, chromium, carbon, boron, zirconium, aluminum, at least one refractory material, and nickel.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE DRAWINGS

In the following discussion, the characteristics of each material are discussed in their wrought form, unless otherwise specified. Materials otherwise specified include, but are not limited to, materials provided as a wire, materials provided with an equiaxed microstructure (EA) single structure, and materials provided with directionally solidified (DS) microstructure. Material properties, as discussed herein, are determined under standard industrial tests at the specified conditions, unless otherwise specified. The material compositions set forth herein are provided in approximate atomic percent, unless otherwise discussed.

A repair material, as embodied by the invention, comprises a nickel-based superalloy composition, for example a nickel-based superalloy material with an austenitic nickel (Ni) matrix. The repair material is useful in the repair of structures, including superalloy articles, such as, but not limited to, turbines, blades, airfoils, buckets, vanes, nozzles, and their components (hereinafter "turbine components")., The superalloy of the turbine component comprises known superalloy compositions, including nickel-based superalloys, cobalt-based superalloys, nickel-iron-based superalloys, and other alloys developed for elevated-temperature service, usually based on group VIIIA elements, where the superalloy encounters relatively severe mechanical stressing, and where high surface stability of the superalloy is frequently required.

The austenitic nickel matrix repair materials (hereinafter "nickel-based repair materials") comprise constituents in amounts that maintain and balance the repair material's strength, weldability adherence (a specific or relative measure of a material's ability to be welded under a given set of conditions, so a completed weld part fulfills all functions for which it was intended), and oxidation resistance. The nickel-based repair material comprises at least one refractory element, and comprise gamma prime ($\gamma'$) in amounts less than about 10 volume percent of the material.

The nickel-based repair material of the invention is metallurgically compatible with a substrate material of a turbine component, such as a superalloy material. Nickel-based repair materials, as embodied by the invention, comprise cobalt (Co), chromium (Cr), carbon (C), boron (B), zirconium (Zr), aluminum (Al), and at least one refractory element including, but not limited to, one of molybdenum (Mo), tungsten (W), rhenium (Re), niobium (Nb), and tantalum (Ta), with a balance (BAL) of the nickel-based repair material comprising nickel (Ni). The ranges (in atomic percent) of each constituent are as follows: cobalt, in a range from about 12.0 to about 15.0; chromium, in a range from about 24.0 to about 30.0; carbon, in a range from about 0.2 to about 3.0; boron, in a range from about 0.02 to about 0.05; zirconium, in a range from about 0.02 to about 0.05; aluminum, in a range from about 0.4 to about 3.0; molybdenum, in a range from about 2.0 to about 7.0; tantalum, in a range from about 0.75 to about 4.0, with the balance nickel. The above refractory element constituents, such as, but not limited to, molybdenum, tantalum, and tungsten, in the nickel-based repair materials promote strengthening, for example solid solution strengthening, of both the repair and turbine component materials.

The nickel-based repair materials comprise at least one additional constituent, including but not limited to, titanium (Ti), and iron (Fe). Additional constituents, if provided in the nickel-based repair materials, are provided in the following atomic percent ranges: niobium, in a range from about 0.6 to about 5.0; titanium, in a range from about 0.25 to about 1.9; rhenium, in a range from about 0.8 to about 1.2; iron, in a range from about 1.9 to about 2.3; and tungsten, in a range from about 1.0 to about 3.0.

Table 1 lists nickel-based repair material ("Materials") compositions, as embodied by the invention, along with known (baseline) nickel-based material compositions, IN617, IN625, and GTD111. The amounts of materials are provided in approximate atomic percents (except as noted), and a balance of the repair material composition comprises nickel.

TABLE 1

| Material[a/o] | Co | Cr | C | B | Zr | Al | Mo | Ta | OTHER | BAL |
|---|---|---|---|---|---|---|---|---|---|---|
| Material 1 | 15.0 | 24.9 | 0.24 | 0.03 | 0.03 | 2.2 | 4.3 | 0.81 | 0.63Nb 1.84Ti | Ni |
| Material 2 | 15.0 | 25.7 | 0.25 | 0.03 | 0.02 | 1.7 | 6.5 | 2.0 | 1.28Ti | Ni |
| Material 3 | 15.0 | 27.0 | 0.25 | 0.03 | 0.02 | 1.0 | 7.0 | 4.0 |  | Ni |
| Material 4 | 15.0 | 27.5 | 0.25 | 0.03 | 0.02 | 1.2 | 6.0 | 2.5 | 5.0Nb 1.5Re | Ni |
| Material 5 | 15.0 | 24.7 | 0.25 | 0.03 | 0.02 | 2.0 | 2.5 | 3.0 |  | Ni |
| Material 6 | 15.0 | 24.7 | 0.25 | 0.03 | 0.02 | 2.0 | 5.0 | 3.0 |  | Ni |
| Material 7 | 15.0 | 24.7 | 0.25 | 0.03 | 0.02 | 2.0 | 5.0 | 3.0 | 1.0Re 1.0W | Ni |
| Material 8 | 15.0 | 24.7 | 0.25 | 0.03 | 0.02 | 3.0 | 5.0 | 1.5 |  | Ni |
| Material 9 | 15.0 | 24.7 | 0.25 | 0.03 | 0.02 | 2.0 | 5.0 | 3.0 | 3.0W | Ni |
| Material 10 | 15.0 | 24.7 | 0.25 | 0.03 | 0.02 | 2.0 | 5.0 | 4.0 | 3.0W | Ni |
| Material 11 | 15.0 | 24.7 | 0.25 | 0.03 | 0.02 | 2.0 | 6.0 | 3.0 | 3.0W | Ni |
| Material A | 15.0 | 24.7 | 0.27 | 0.03 | 0.02 | 2.0 | 5.5 | 3.5 | 2.0W | Ni |
| Material B | 15.0 | 24.7 | 0.27 | 0.03 | 0.02 | 2.0 | 5.5 | 3.5 | 1.25Mn 2.0W 1.0Si | Ni |
| Material C | 15.0 | 24.7 | 0.27 | 0.03 | 0.02 | 2.0 | 5.5 | 3.5 | 1.25Mn 2.0W 2.0Si | Ni |
| Material D | 15.0 | 24.7 | 0.27 | 0.03 | 0.02 | 2.0 | 5.0 | 4.0 | 1.25Mn 3.0W 1.0Si | Ni |
| Material E | 15.0 | 24.7 | 0.27 | 0.03 | 0.02 | 2.0 | 5.0 | 4.0 | 1.25Mn | Ni |

TABLE 1-continued

| Material[a/o] | Co | Cr | C | B | Zr | Al | Mo | Ta | OTHER | BAL |
|---|---|---|---|---|---|---|---|---|---|---|
| Material F | 10.2 | 23.0 | | | | 2.2 | 6.2 | | 3.0W<br>2.0Si<br>0.8W | Ni |
| IN625 | | 24.64 | 0.25 | | | 0.44 | 5.6 | | 2.1Fe<br>0.25Ti<br>2.3Nb | Ni |
| IN617 | 12.4 | 24.7 | 0.3 | | | 2.2 | 5.5 | | | Ni |
| GTD111<br>(weight<br>percent) | 9.3 | 15.5 | 0.5 | 0.05 | | 6.4 | 0.9 | 0.9 | 1.2W<br>5.9Ti | Ni |

The nickel-based repair materials, as embodied by the invention, exhibit enhanced oxidation resistance, which is comparable and often superior to known repair materials. Chromium, aluminum, manganese, and silicon constituents in the nickel-based repair material, both individually and in combination, enhance oxidation resistance of the nickel-based repair materials. Silicon and manganese additions also promote enhanced resistance to oxide spallation. Table 2 is a listing of oxidation characteristics in weight change per area (mg/cm$^2$) for selected repair materials at about 2000° F. (1093° C.).

Materials D and E exhibit beneficial oxidation resistance results due to increased silicon amounts in the nickel-based repair material. Increased molybdenum amounts enhance oxidation resistance for Material E, as compared to oxidation resistance of Material A. Material E provides desirable oxidation resistance for a repair material and for use in a repair process. For example, nickel-based repair material Material E possesses enhanced oxidation resistance, where it loses only about 30 mg/cm$^2$ in about 1000 hours of oxidation at about 2000° F. (1093° C.). By comparison, IN625 loses about a similar material amount in less than

TABLE 2

| Hrs. at 2000° F. | GTD111 wire | GTD111 ea | IN625 wire | DS IN625 | Mtl. 1 | Mtl. 5 | Mtl. 6 | Mtl. 7 | Mtl. 8 | IN617 wire |
|---|---|---|---|---|---|---|---|---|---|---|
| 24 | −3.5 | −1.4 | −2.1 | −11.9 | 1.4 | −0.7 | −1.2 | 0.1 | −0.7 | 0.7 |
| 48 | −6.7 | −4.7 | −2.1 | −70.0 | 1.4 | 0.2 | −0.7 | 0.3 | 0.5 | 0.7 |
| 72 | −9.7 | −6.1 | −6.1 | | 0.9 | 0.6 | −0.1 | −0.5 | 0.6 | 0.2 |
| 141 | −16.1 | −10.1 | −15.7 | | 0.3 | 0.8 | −0.3 | −0.7 | 0.6 | 0.0 |
| 237 | −19.4 | −14.9 | −37.6 | | −0.8 | −1.5 | −1.7 | −1.5 | −0.3 | |
| 309 | −24.0 | −18.0 | −67.0 | | −9.7 | −5.1 | −3.2 | −3.6 | −1.7 | −1.2 |
| 405 | −28.3 | −23.7 | −112.0 | | −58.0 | −10.1 | −15.9 | −8.9 | −4.1 | −1.9 |
| 477 | −32.6 | −29.0 | −149.0 | | −104 | −13.7 | −9.2 | −14.0 | −6.8 | −3.4 |
| 573 | −41.6 | −37.2 | −180.0 | | −160 | −17.4 | −13.8 | −20.3 | −11.2 | −7.0 |
| 645 | −58.4 | −44.1 | | | | −19.3 | −17.1 | −28.6 | −15.9 | −10.4 |
| 741 | −88.6 | −56.6 | | | | −22.6 | −20.8 | −47.0 | −21.0 | −13.8 |
| 813 | −119.0 | −67.7 | | | | −24.2 | −28.1 | −73.0 | −25.9 | −15.9 |
| 909 | −121.0 | −80.8 | | | | −26.4 | −45.4 | −91.9 | −32.1 | −18.5 |
| 1002 | −137.0 | −99.5 | | | | −33.1 | −70.1 | −103 | −42.0 | −22.3 |

Figure 1:
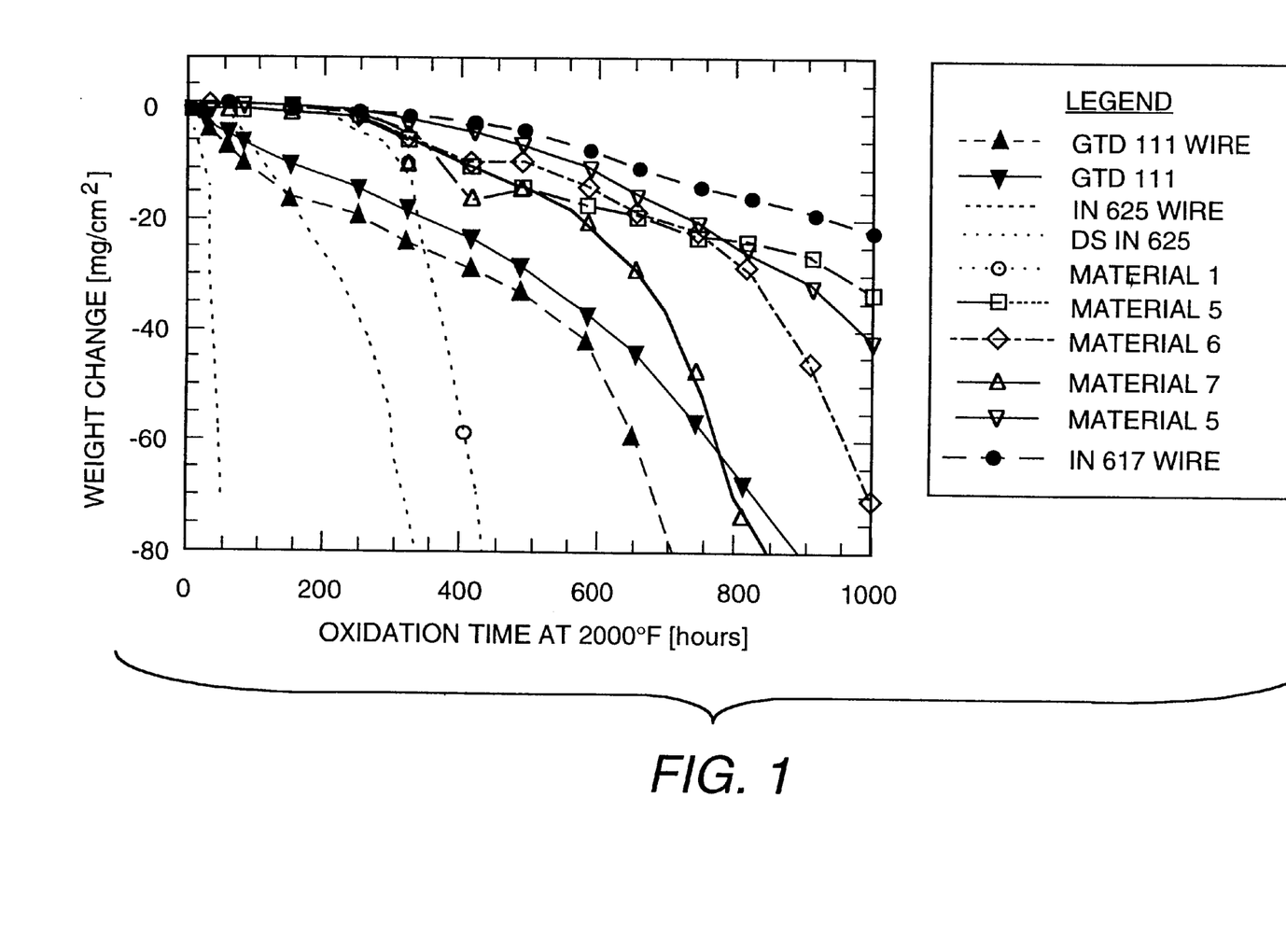
FIG. 1 a graphical representation of oxidation resistance curves for known materials and nickel-based repair materials.
Figure 2:
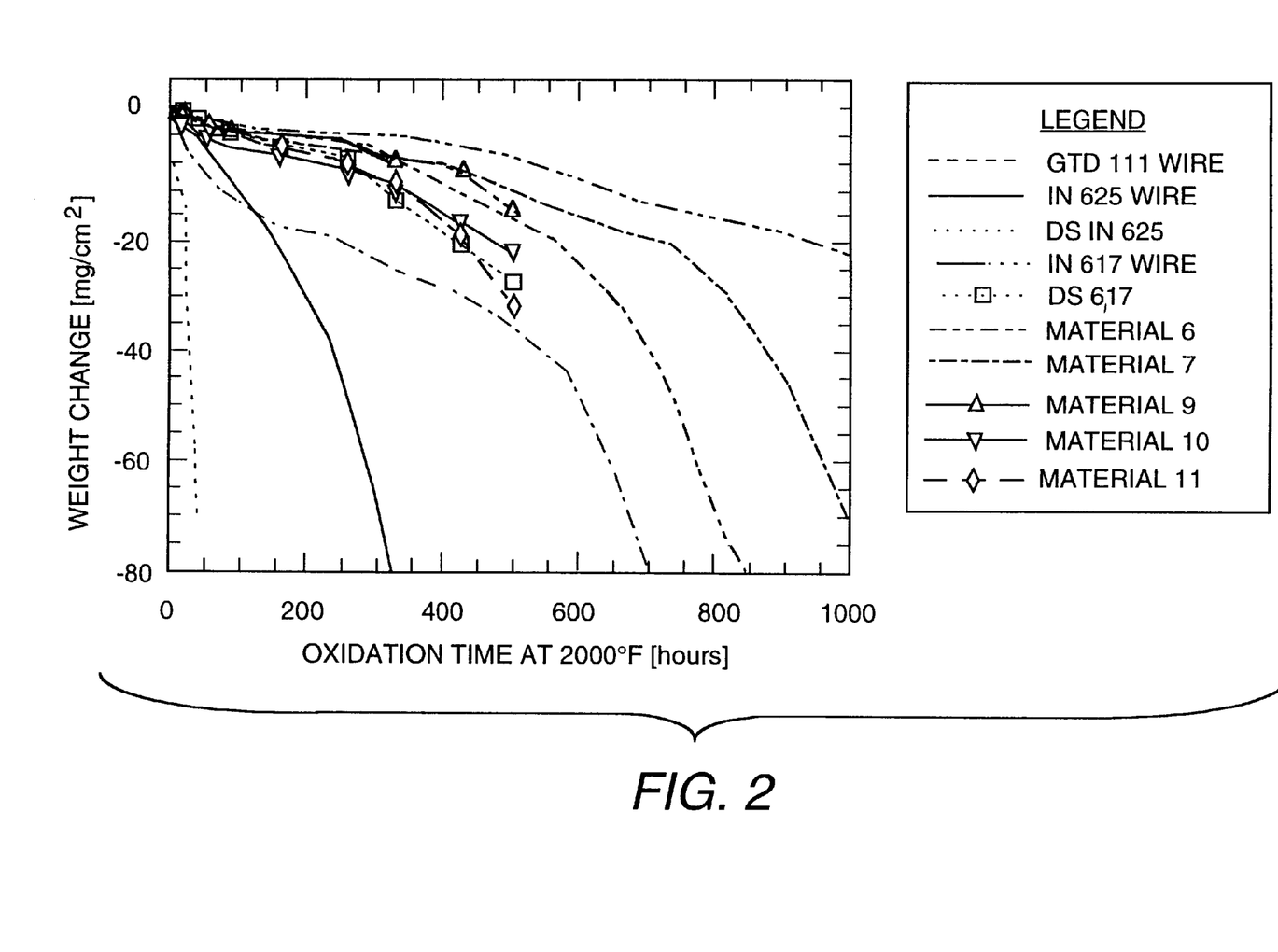
FIG. 2 a graphical representation of oxidation resistance curves for known materials and nickel-based repair materials.
Figure 3:
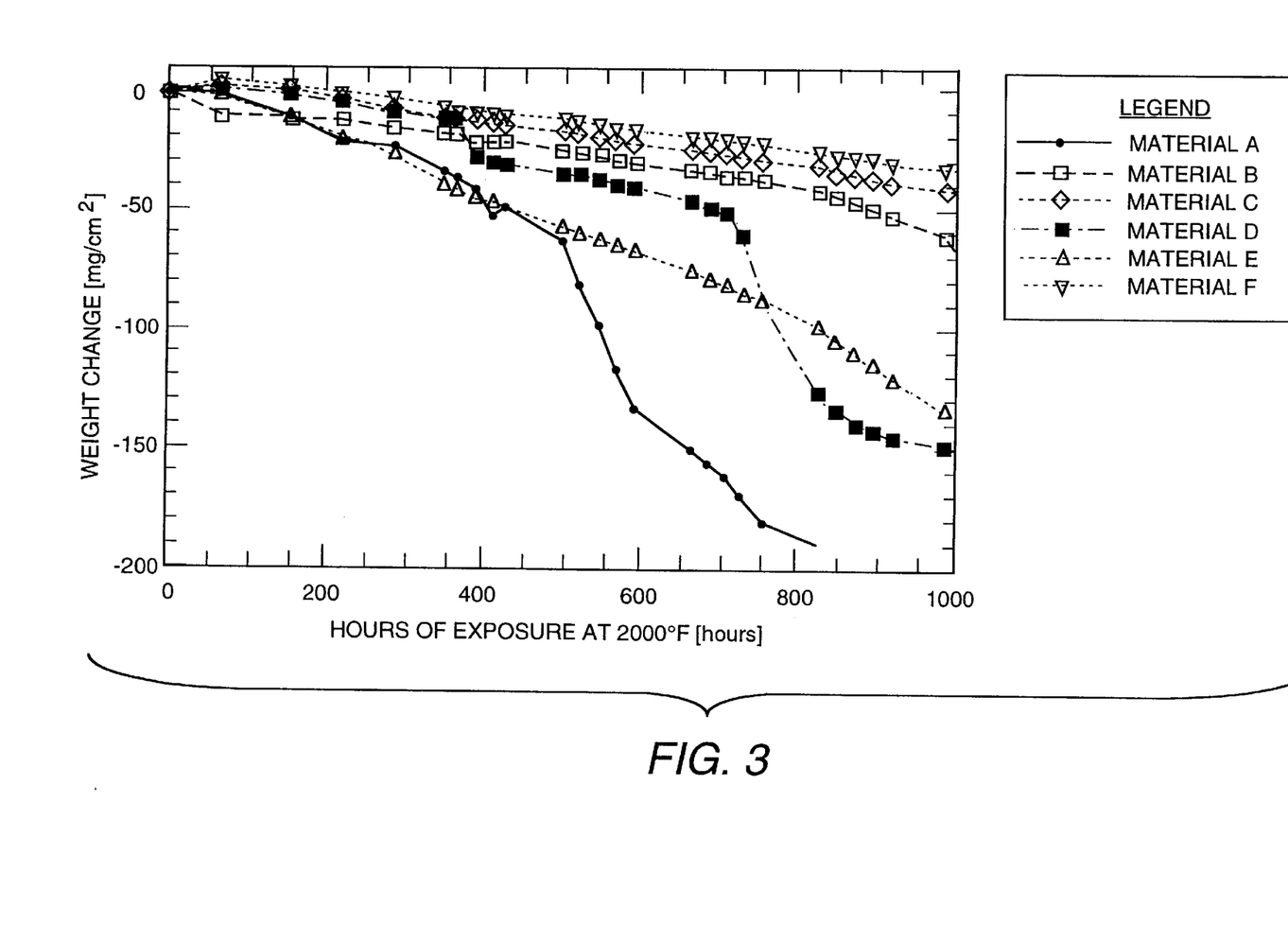
FIG. 3 is a graphical representation of oxidation resistance curves for nickel-based repair materials.

FIGS. 1 and 2 are graphical representations of oxidation resistance curves for known materials and nickel-based repair materials, as embodied by the invention. FIG. 3 is a graphical representation of oxidation resistance curves for Materials A–F as a function of exposure time at about 2000° F. (1093° C.). The oxidation curves illustrate weight change per area for oxidation versus time at about 2000° F. (1093° C.). The known materials comprise IN625, GTD111, and IN617, and are provided in wire and wrought forms, and with directionally solidified (DS) and equiaxed (EA) structures, as indicated.

The nickel-based repair materials, as embodied by the invention, (with the exception of repair material Material 1) exhibit oxidation resistance, which is similar to or enhanced when compared to the oxidation resistance of GTD111. (The oxidation resistance properties of Materials 2–4 are similar to Material 1, and are not illustrated.) The nickel-based repair materials lose minor amounts of material that make them suitable for high temperature applications, such as found in turbine applications. Material 6 exhibits reduced oxidation, about a 30 mg/cm$^2$ loss in about 850 hours at about 2500° F. (1093° C.), where a similar IN625 loss occurs in about 150 hours under similar conditions.

only about 150 hours of oxidation at about 2000° F. (1093° C.), and GTD111 loses a similar material amount in only about 500 hours of oxidation at about 2000° F. (1093° C.).

In addition to the enhanced oxidation resistance, the nickel-based repair materials, as embodied by the invention, possess desirable strengths, such as an enhanced rupture strength. The high rupture strength enhances the breakage resistance of the repair material. The desirable rupture strength in nickel-based superalloys may be reduced by materials added to enhance oxidation resistance. Accordingly, material amounts added to superalloys are provided in amounts to obtain enhanced oxidation resistance and enhanced strengths.

Rupture strengths of superalloy repair materials can be adversely effected by high amounts of manganese and silicon. For example, Materials A, B, and C possess rupture lives that fall in a range from about 68 hours to about 98 hours when tested with a rupture test at about 2000° F.(1093° C.)/3ksi in air due to increased amounts of manganese and silicon. Thus, manganese and silicon amounts in superalloy repair materials are provided in amounts that achieve desirable enhanced rupture strengths with enhanced oxidation resistance.

Figure 4:
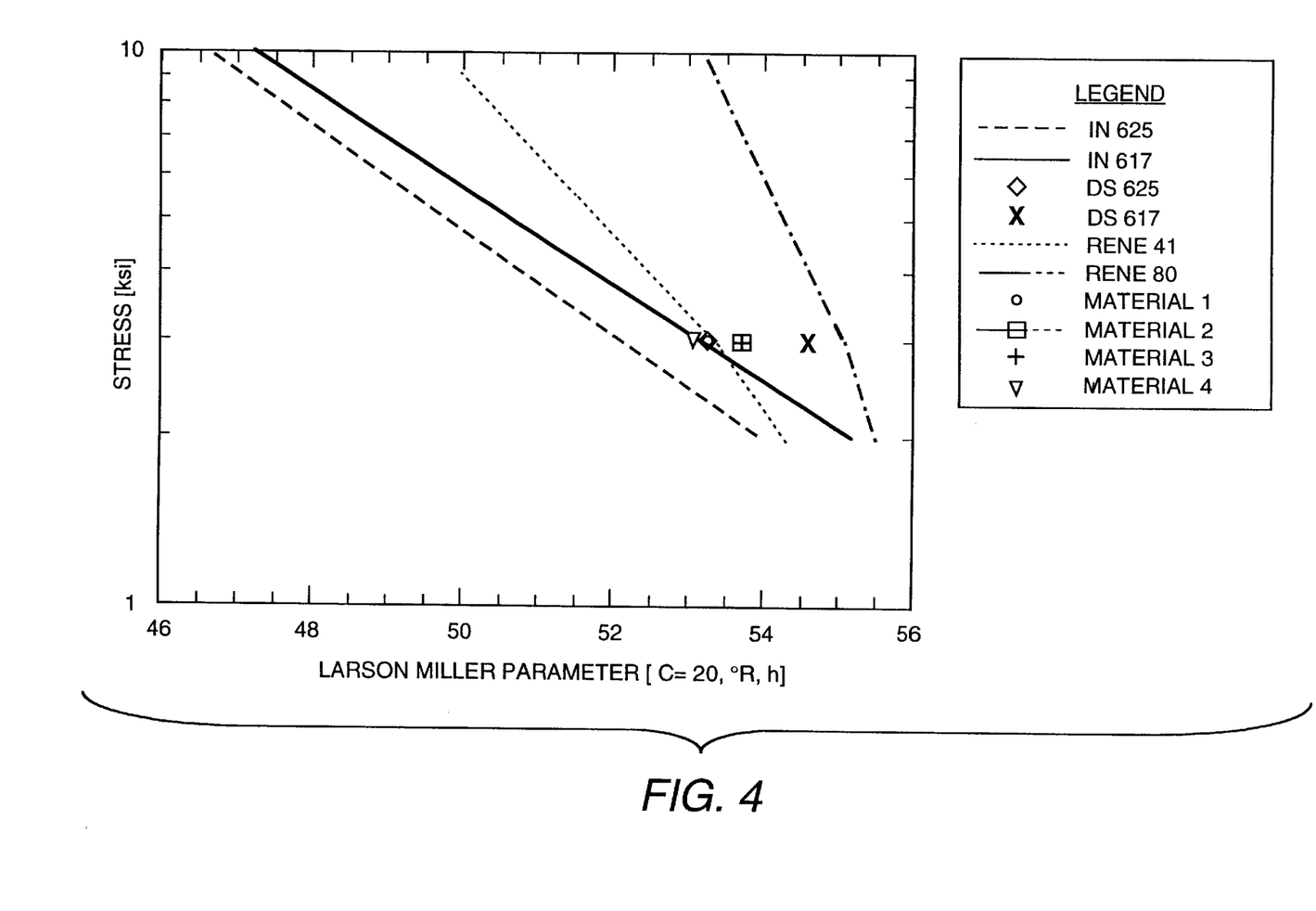
FIGS. 4 and 5 are graphical representations of strength as rupture behavior for nickel-based repair materials.
Figure 5:
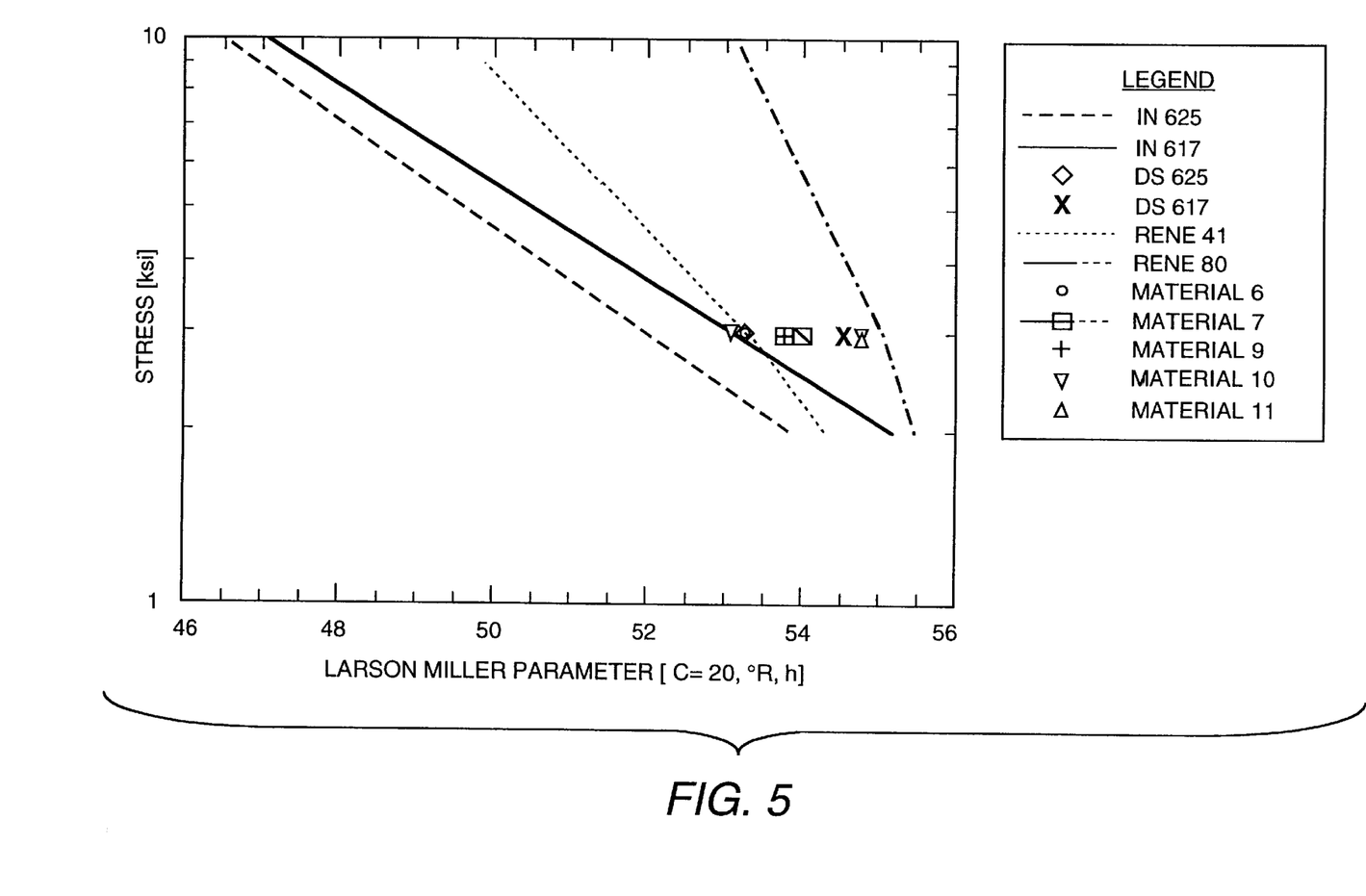

FIGS. 4 and 5 are graphical representations of strength as rupture behavior (stress versus Larson Miller parameter $P_{LM}=T(c+\log t)$ [c=20, T in °R, t in hours]) for nickel-based repair materials, as embodied by the invention. The graphs also illustrate rupture behavior curves for DS IN625 and DS IN617 materials and gamma prime ($\gamma'$) strengthened superalloys, such as, but not limited to, Rene 80 and Rene 41 (trademark General Electric Company). Rupture strength is determined at sample gage centers using tests known in the art.

FIG. 4 illustrates rupture behavior curves for DS Materials 1, 5, and 6 and FIG. 5 illustrates rupture behavior curves for DS Materials 2, 3, 4, 9, 10 and 11, compared to DS IN625 and DS IN617. The rupture behavior curves indicate enhanced rupture strengths for nickel-based repair materials, as embodied by the invention, compared to DS IN625 and DS IN617. Repair material lifetimes, under rupture tests at 2000° F.(1093° C.)/3ksi in air for materials are as follows: DS IN617 about 160 hrs.; Material 9 about 77 hrs.; Material 10 about 198 hrs.; Material 11 about 186 hrs.; Material 2 about 67 hrs.; Material 3 about 68 hrs.; and Material 4 about 37 hrs.

In addition to the enhanced oxidation resistance, repair material DS Material 6 possesses reduced weld cracking frequency and extended rupture life during rupture tests at 2000° F./3ksi. The rupture life of DS Material 6 is about six times longer than a rupture life of DS IN625 material under the same conditions.

Table 3 provides strength, ductility, and oxidation data for Materials A–F, as embodied by the invention. The nickel-based repair materials, Materials A–F remain relatively ductile, which is desirable for a turbine repair material, as the material is easily worked during the repair process. Their strength is enhanced and both nickel-based repair materials Materials D and E exhibit strengths at least equivalent to known superalloy materials at 2000° F. (1093° C.)/3ksi.

TABLE 3

| Material | Strength YS/UTS 1800° F.-ksi | Ductility % el/RA 1800° F. | Rupture 2000 F./3 ksi (hours) | Oxidation Loss @ 1000 hr/2000° F. |
|---|---|---|---|---|
| Material A | 23/23 | 76/80 | 79.3 | >200 mg/cm2 |
| Material B | 21/23 | 80/90 | 97.2 | 55 |
| Material C | 19/24 | 62/82 | 68.2 | 40 |
| Material D | 19/21 | 91/89 | 211.7 | 160 |
| Material E | 22/29 | 61/81 | 337.4 | 30 |
| Material F | 18/20 | 103/92 | 40.1 | 150 |

The rupture behavior of Materials D and E, as embodied by the invention, indicates enhanced strengths from increased amounts of tungsten and tantalum (compared with Materials B and C). The rupture life of directionally solidified Material E is approximately twice the life of a directionally solidified IN617 and is approximately equal to the life of an equiaxed gamma prime ($\gamma'$) strengthened Rene 80 under rupture tests at 2000° F.(1093° C.)/3ksi. Material E fails in rupture tests at 3ksi in air after about 335 hours at about 2000° F. (1093° C.). Comparatively, a directionally solidified IN625 material fails after only about 50 hours, while a directionally solidified IN617 fails after only about 160 hours, in rupture tests under similar conditions. Material E also provides reduced cracking frequency when used in an unconstrained weld repair process, on a turbine component such as a turbine component formed of GTD111. The nickel-based repair Material E, as an unconstrained weld, does not exhibit cracking after heat treatments. In constrained welds, cracking occurs.

In a superalloy article repair process, the repair material, as embodied by the invention, is provided in the appropriate form for the repair process. For example, and in no way limiting of the invention, the repair process may comprise grinding a damaged tip to a depth approximately equal to a turbine component tip cover plane. A new turbine component tip is built up on the cover plane by a multiple weld-pass repair process with a wire repair material formed from the repair material, as embodied by the invention. The repair material is fed as a wire into a liquid weld pool on the turbine component tip as the weld torch is traversed around the bucket perimeter to form a new tip. Further, the repair material may be fed into a weld pool at a defect in a turbine component, and re-solidified with the turbine component to repair the turbine component. The scope of the repair process, as embodied by the invention, using the repair material, as embodied by the invention, comprises any appropriate repair process that employs repair material.

While various embodiments are described herein, it will be appreciated from the specification that various combinations of elements, variations or improvements therein may be made by those skilled in the art, and are within the scope of the invention.

What is claimed is:

1. A superalloy article comprising a repair material, the repair material comprising, in atomic percent:

cobalt, in a range from about 10.0 to about 15.0;

chromium, in a range from about 24.0 to about 30.0;

carbon, in a range from about 0.2 to about 0.3;

boron, in a range from about 0.02 to about 0.05;

zirconium, in a range from about 0.02 to about 0.05;

aluminum, in a range from about 0.4 to about 3.0;

at least one refractory material selected from the group consisting of molybdenum, tantalum, tungsten, niobium, rhenium, and combinations thereof, in a range from about 0.75 to about 7.0;

silicon, in a range from about 1.1 to about 2.0;

about 1.25 atomic percent manganese; and nickel, as a balance of the composition.

2. The superalloy article according to claim 1, wherein the refractory material comprises at least one of molybdenum and tantalum.

3. The superalloy article according to claim 1, wherein the at least one refractory material comprises at least one of molybdenum, in a range from about 2.0 to about 7.0 atomic percent; and tantalum, in a range from about 0.75 to about 4.0 atomic percent.

4. The superalloy article according to claim 1, wherein the refractory material comprises molybdenum and tantalum.

5. The superalloy article according to claim 4, wherein the molybdenum is provided in a range from about 2.0 to about 7.0 atomic percent, and tantalum is provided in a range from about 0.75 to about 4.0 atomic percent.

6. The superalloy article according to claim 1, wherein the refractory material comprises at least one of molybdenum, tungsten, and tantalum.

7. The superalloy article according to claim 6, wherein the at least one refractory material comprises at least one of molybdenum, in a range from about 2.0 to about 7.0 atomic percent; tungsten, in a range from about 1.0 to about 3.0 atomic percent; and tantalum, in a range from about 0.75 to about 4.0 atomic percent.

8. The superalloy article according to claim 1, wherein the repair material further comprises titanium in a range from about 0.25 to about 1.9 atomic percent.

9. The superalloy article according to claim 1, wherein the repair material further comprises at least one of titanium, in a range from about 0.25 to about 1.9 atomic percent; and rhenium, in a range from about 0.8 to about 1.2 atomic percent.

10. The superalloy article according to claim 1, the refractory material comprises molybdenum and tantalum, the repair material comprising cobalt at about 15.0 atomic percent, chromium at about 24.7 atomic percent, carbon at about 0.25 atomic percent, boron at about 0.03 atomic percent, zirconium at about 0.02 atomic percent, aluminum at about 2.0 atomic percent, molybdenum at about 5.0 atomic percent, tantalum at about 3.0 atomic percent, and nickel as a balance.

11. The superalloy article according to claim 1, wherein the at least one refractory material comprises molybdenum and tantalum, and the repair material comprises cobalt at about 15.0 atomic percent, chromium at about 24.7 atomic percent, carbon at about 0.27 atomic percent, boron at about 0.03 atomic percent, zirconium at about 0.02 atomic percent, aluminum at about 2.0 atomic percent, molybdenum at about 5.0 atomic percent, tantalum at about 4.0 atomic percent, manganese at about 1.25 atomic percent, tungsten at about 3.0 atomic percent, silicon at about 2.0 atomic percent, and nickel as a balance.

12. The superalloy article according to claim 1, wherein the repair material comprises γ' amounts less than about 10 volume percent of the material.

13. The superalloy article according to claim 1, wherein the superalloy article comprises a turbine component.

14. The superalloy article according to claim 13, wherein the turbine component comprises at least one of a nickel-based superalloy, a nickel-iron based superalloy, and a cobalt-based superalloy.

15. The superalloy article according to claim 14, wherein the turbine component comprises one of a nickel-based superalloy.

16. A repair process for repairing a superalloy article, the repair process comprising:
providing a repair material; and
joining the repair material to the superalloy article, the repair material comprising in atomic percent:
cobalt, in a range from about 10.0 to about 15.0;
chromium, in a range from about 24.0 to about 30.0;
carbon, in a range from about 0.2 to about 0.3;
boron, in a range from about 0.02 to about 0.05;
zirconium, in a range from about 0.02 to about 0.05;
aluminum, in a range from about 0.4 to about 3.0;
at least one refractory material selected from the group consisting of molybdenum, tantalum, tungsten, niobium, rhenium, and combinations thereof, in a range from about 0.75 to about 7.0;
silicon, in a range from about 1.1 to about 2.0;
about 1.25 atomic percent manganese; and
nickel, as a balance of the composition.

17. The process according to claim 16, wherein the refractory material comprises at least one of molybdenum and tantalum.

18. The process according to claim 16, wherein the at least one refractory material comprises at least one of molybdenum, in a range from about 2.0 to about 7.0 atomic percent, and tantalum in a range from about 0.75 to about 4.0 atomic percent.

19. The process according to claim 16, wherein the refractory material comprises molybdenum and tantalum.

20. The process according to claim 19, wherein the molybdenum is provided in a range from about 2.0 to about 7.0 atomic percent, and tantalum is provided in a range from about 0.75 to about 4.0 atomic percent.

21. The process according to claim 16, wherein the at least one refractory material comprises at least one of molybdenum, in a range from about 2.0 to about 7.0 atomic percent; tungsten, in a range from about 1.0 to about 3.0 atomic percent; and tantalum, in a range from about 0.75 to about 4.0 atomic percent.

22. The process according to claim 16, wherein said repair material further comprises titanium in the range from about 0.25 to about 1.9 atomic percent.

23. The process according to claim 16, wherein the at least one refractory material comprises molybdenum and tantalum.

24. The process according to claim 16, wherein the repair material comprises molybdenum and tantalum as the at least one refractory material, and further comprises cobalt at about 15.0 atomic percent, chromium at about 24.7 atomic percent, carbon at about 0.25 atomic percent, boron at about 0.03 atomic percent, zirconium at about 0.02 atomic percent, aluminum at about 2.0 atomic percent, molybdenum at about 5.0 atomic percent, tantalum at about 3.0 atomic percent, and nickel as a balance.

25. The process according to claim 16, wherein the at least one refractory material comprises molybdenum and tantalum, and the repair material comprises cobalt at about 15.0 atomic percent, chromium at about 24.7 atomic percent, carbon at about 0.27 atomic percent, boron at about 0.03 atomic percent, zirconium at about 0.02 atomic percent, aluminum at about 2.0 atomic percent, molybdenum at about 5.0 atomic percent, tantalum at about 4.0 atomic percent, about 1.25 atomic percent manganese, about 3.0 atomic percent tungsten, about 2.0 atomic percent silicon, and nickel as a balance.

26. The process according to claim 16, wherein the superalloy article comprises a turbine component.

27. The process according to claim 26, wherein the turbine component comprises at least one of a nickel-based superalloy, a nickel-iron based superalloy, and a cobalt-based superalloy.

* * * * *